(12) United States Patent
Hirabayashi

(10) Patent No.: US 6,501,795 B1
(45) Date of Patent: *Dec. 31, 2002

(54) ADAPTABLE INTRAFRAME/INTERFRAME MOTION VIDEO ENCODER

(75) Inventor: Yasuji Hirabayashi, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/907,493

(22) Filed: Aug. 8, 1997

Related U.S. Application Data

(63) Continuation of application No. 08/350,148, filed on Nov. 29, 1994, now abandoned.

(30) Foreign Application Priority Data

Dec. 1, 1993 (JP) ............................................. 5-301650

(51) Int. Cl.[7] ................................................. H04N 7/18
(52) U.S. Cl. ............................ 375/240.12; 375/240.14; 375/240.15
(58) Field of Search ................................. 348/420, 421, 348/409, 413, 412, 411, 415, 416, 402, 401, 400, 390, 384; 358/430, 261.2; 382/238; 375/240.12–240.17

(56) References Cited

U.S. PATENT DOCUMENTS

| | | | | |
|---|---|---|---|---|
| 4,571,618 A | * | 2/1986 | Hatori et al. | 348/412 |
| 4,811,112 A | * | 3/1989 | Rutledge | 358/430 |
| 5,063,524 A | * | 11/1991 | Ferre et al. | 348/416 |
| 5,067,015 A | * | 11/1991 | Combridge | 348/421 |
| 5,068,724 A | * | 11/1991 | Krause et al. | 348/402 |
| 5,136,378 A | * | 8/1992 | Tsurube | 348/415 |
| 5,210,605 A | * | 5/1993 | Zaccarin et al. | 348/415 |
| 5,262,878 A | * | 11/1993 | Esserman | 358/430 |
| 5,347,308 A | * | 9/1994 | Wai | 348/420 |
| 5,412,435 A | * | 5/1995 | Nakajima | 348/413 |
| 5,442,400 A | * | 8/1995 | Sun et al. | 348/409 |
| 5,459,515 A | * | 10/1995 | Chevance et al. | 348/402 |
| 5,467,086 A | * | 11/1995 | Jeong | 348/415 |
| 5,467,134 A | * | 11/1995 | Laney et al. | 348/409 |
| 5,539,466 A | * | 7/1996 | Igarashi et al. | 348/412 |
| 5,561,477 A | * | 10/1996 | Polit | 348/700 |

* cited by examiner

*Primary Examiner*—Andy Rao
(74) *Attorney, Agent, or Firm*—Fitzpatrick, Cella, Harper & Scinto

(57) ABSTRACT

A moving-picture encoder performs efficient encoding by selecting prescribed encoding on the basis of a decoded block of a frame which includes a block to be encoded, and performing predictive encoding of the block to be encoded by using the selected encoding.

9 Claims, 7 Drawing Sheets

ADAPTABLE INTRAFRAME/INTERFRAME MOTION VIDEO ENCODER

This application is a continuation of application Ser. No. 08/350,148 filed Nov. 29, 1994, now abandoned.

BACKGROUND OF THE INVENTION

The invention relates to a moving-picture encoding apparatus for encoding a moving picture in block units.

Conventionally, the encoding of a moving picture employs a block encoding method. In block encoding, three encoding methods are used adaptively, namely (1) encoding of interframe difference, (2) motion-compensated encoding of interframe difference and (3) intraframe encoding.

These three methods of encoding are described below.

(1) Encoding of Interframe Difference

This is an encoding method of obtaining the difference between a block to be encoded and a block at the same position in the previous frame and then encoding the difference. With the method of encoding interframe difference, the difference becomes closer to zero the higher the correlation between frames. Encoding is more efficient as a result. The block of difference data is subjected to a discrete cosine transformation, the transform coefficient data obtained is quantized and Huffman codes are subsequently assigned. When all of the data becomes zero after quantization, this means that the quantized image is the same as that of the same block in the previous frame. Accordingly, there is no transmission of code.

(2) Method of Motion-compensated Encoding Interframe Difference

This method involves matching the block to be encoded and neighboring blocks centered on the block at the same position in the previous frame, selecting the block that is most similar and obtaining the difference between the blocks. The difference data is subjected to a discrete cosine transformation and subsequently quantized. Huffman codes are then assigned.

(3) Method of Intraframe Encoding

In a case where the correlation between frames is small, the dynamic range is widened and the amount of information is increased rather than decreased by taking the difference between the frames. In this case, therefore, intraframe encoding is carried out. In intraframe encoding, the discrete cosine transformation is applied to the original image directly, followed by quantization and encoding.

A method of deciding which of these three conventional encoding methods to use is described with reference to FIG. 6, which is a flowchart of the deciding processing.

In FIG. 6, it is determined at step S21 whether an output-code buffer (not shown) has overflowed. If the decision rendered is YES, the program proceeds to step S24 and the method of coding interframe difference is used. If a NO decision is rendered at step S21, the program proceeds to step S22, where it is decided whether to perform motion compensation. As shown in FIG. 7, the decision is made using the average of the absolute-value differences between blocks when motion compensation is performed and the average of the absolute-value differences between blocks when motion compensation is not performed. If the result of the decision at step S22 is YES (motion compensation ON), the program proceeds to step S25 and the method of motion-compensated encoding of interframe difference is used.

If the result of the decision at step S22 is NO (motion compensation OFF), the program proceeds to step S23, where a decision is made to use encoding of interframe difference or intraframe encoding. As shown in FIG. 8, the decision of step S22 is performed using variance values of intraframe data and a geometrical average of interframe difference. Intraframe encoding is performed at step S26 or encoding of intraframe difference at step S27, depending upon the decision rendered at step S23.

In the above-described decision processing, the statistics of a 16×16 pixel block of luminance data are used. Furthermore, in the encoding described below, the unit of processing is 8×8 pixels. As for the breakdown, the 16×16 pixel block is partitioned into four blocks of 8×8 pixels, and there is a total of six 8×8 pixel blocks of the four 8×8 pixel blocks and two 8×8 pixel blocks of color difference data describing a position that is spatially the same as the four 8×8 pixel blocks. Encoding processing of the same mode is applied to the six 8×8 pixel blocks.

Control of the amount of code generated is described below.

Control for making the amount of generated encoded data conform to the transmission rate is required. This is carried out by the following method: The generated code is fed into a buffer whose code capacity is equivalent to one frame. The code is sequentially transmitted from the buffer at a speed commensurate with the transmission rate. The encoder monitors the sufficiency of the code in the buffer and suppresses the generation of code by enlarging the quantization step when the amount of code that has been generated is excessive. Conversely, the encoder generates more code by reducing the quantization step when the rate at which code is generated falls below the transmission rate. When the buffer overflows, the encoder makes the quantization step very large and halts the generation of code. By virtue of this operation, a fixed amount of code is generated per unit time.

The operation of the encoder is described with reference to FIG. 9. Block data that has entered from a connector 301 is transmitted on lines 302 and 303. Meanwhile, an overflow signal from the output-code buffer (not shown) enters from a connector 304 and is transmitted on lines 305 and 306. A mode decision unit 37 decides the processing mode in accordance with the above-described method upon referring to the block data on line 303 and a previous-frame memory 38. When it has been decided that the method of encoding interframe difference is appropriate, the mode decision unit 37 reads data of a block at a position identical with that of the input block out of the previous-frame memory 38 via line 307 and outputs the data on the signal line 308. When it has been decided that the method of motion-compensating encoding of interframe difference is appropriate, the mode decision unit 37 reads the best matching block data out of the previous-frame memory 38 via line 307 and outputs the data on the signal line 308. When it has been decided that the intraframe encoding method is appropriate, the mode decision unit 37 produces zero data and outputs the data on the line 308. At the same time, the mode decision unit 37 outputs, on a line 312, vector data representing the relative position of the best matching block, which has been obtained by motion compensation, and the encoded block. The block data on the line 308 is transmitted on lines 309 and 310.

The difference between the block data from the line 310 and the input block data from the line 302 is determined and provided to a masking unit 32 via a DCT (direct cosine transform) circuit 31. When the signal from the connector 304 indicates an overflow state, the mode decision unit 37 selects interframe-difference encoding unconditionally and the masking unit 32 masks all of the difference data to zero. The DCT coefficient data from the masking unit 32 is quantized by a quantizer 33 and the quantized data is provided to an encoder 34 and a reverse quantizer 35. In response to a selection-mode signal from line 311, the encoder 34 assigns a Huffman code to the quantized DCT coefficient data and outputs the result on a line 313. By means of reverse quantization, the reverse quantizer 35 reproduces frequency data identical with that provided to an external decoder, not shown. The reproduced frequency data is again transformed into a difference signal by a reverse-DCT circuit 36, and this difference signal is added to the signal from the line 309, thereby reproducing an image identical with that transmitted. This image is again stored in the previous-frame memory 38.

With the example of the prior art described above, intraframe encoding is performed in a case where the predicted error is very large. Interframe encoding is performed in other cases.

Consider a case in which the 16×16 pixel block of luminance data is almost entirely flat, the two 8×8 pixel blocks of color-difference data are also flat, the image of the previous frame is large and is an image having an AC component. Such a condition tends to occur when a transition is made from a complicated image to a flat, even image owing to a scene change.

When the conventional encoding methods are used under these circumstances, it is found that interframe encoding is unsuitable because the power of the difference between images is too large. Though intraframe encoding can be used, a large amount of code is produced with this method. In either case, a problem arises that a great deal of code is produced when encoding an image having little redundancy.

SUMMARY OF THE INVENTION

Accordingly, an object of the present invention is to provide a moving-picture encoding apparatus capable of performing more efficient encoding.

According to the present invention, the foregoing object is attained by providing a moving-picture encoding apparatus for performing encoding in block units, comprising:

selecting means for selecting prescribed encoding on the basis of a decoded block of a frame which includes a block to be encoded; and encoding means for performing predictive encoding of the block to be encoded by using the encoding selected by the selecting means.

In accordance with this arrangement, the decoded image portion of a frame currently undergoing encoding is used without obtaining a predicted image only in past frames. This makes it possible to perform encoding more efficiently.

Other features and advantages of the present invention are apparent from the following description taken in conjunction with the accompanying drawings, in which like reference characters designate the same or similar parts throughout the figures thereof.

DESCRIPTION OF THE PREFERRED EMBODIMENT

A preferred embodiment of the present invention is described in detail below with reference to the drawings.

Figure 2:
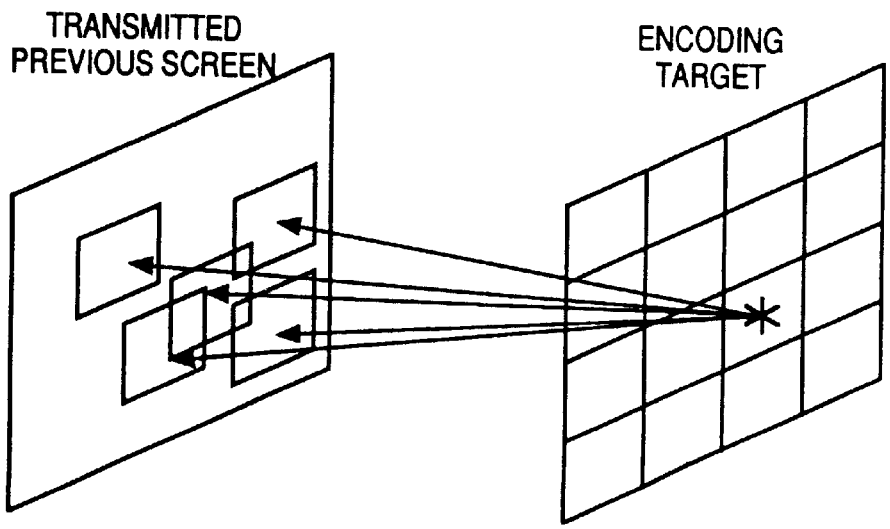
FIG. 2 is a conceptual view of interframe motion compensation carried out in the prior art.

FIG. 2 illustrates the usually used method of interframe motion compensation (interframe MC). A closely resembling block exhibiting the smallest difference with respect to a block, which is to be encoded, in a given frame is found in the frame which precedes the given frame. This is accomplished as follows: In the preceding frame, a block occupying the same spatial position as the block to be encoded is adopted as a reference. Next, a zone having a size of several pixels in the vertical and horizontal directions is shifted one pixel at a time from the reference block, the difference between blocks is found each time and the block for which the difference is smallest is selected.

Figure 1:
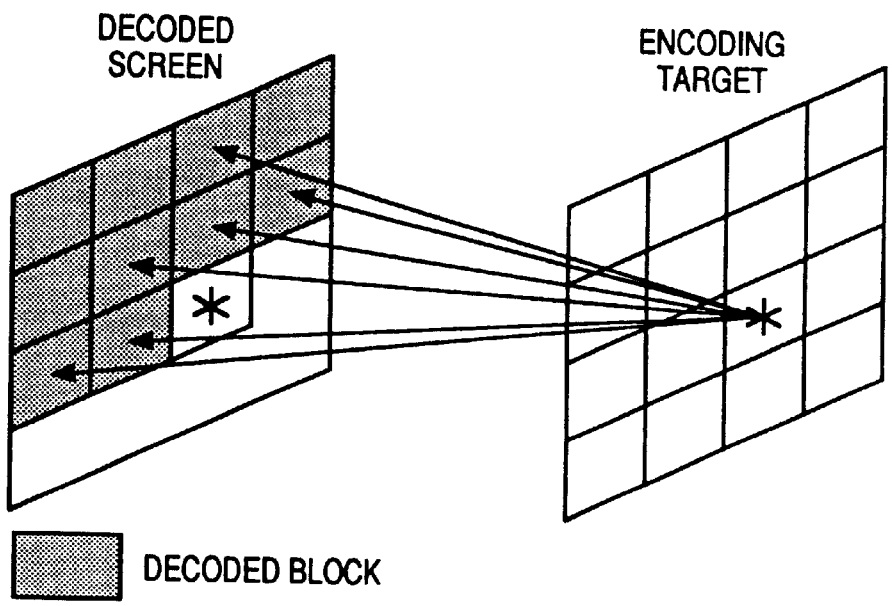
FIG. 1 is a conceptual view of intraframe near-vicinity motion compensation according to an embodiment of the present invention.

FIG. 1 is a diagram showing a method of intraframe near-vicinity motion compensation (intraframe near-vicinity MC), which is a characterizing feature of the present invention. Generally, in the predictive encoding of a moving picture, the previously transmitted frame is used as the basis for predicting the value of the next frame. Therefore, a decoding operation is even performed on the transmitting side in the same manner as on the receiving side to produce an image which is the same as that obtained by the receiving party. This operation is carried out in parallel with encoding. Accordingly, when a given block is to be encoded, the block preceding this block is already in a decoded state. With intraframe near-vicinity MC, a block resembling the block to be encoded is found from among the decoded blocks that precede the block to be encoded.

The operation of the encoding apparatus according to this embodiment is described with reference to the block diagram of FIG. 3. Block data input to a terminal 201 is transmitted on lines 103, 202. Meanwhile, a signal representing an overflow of an output-code buffer 29 is outputted from a code-amount decision circuit 30 to a terminal 208 and is transmitted on lines 102 and 205. Further, a signal representing the value of a quantization step g is outputted from the code-amount decision circuit 30 to a terminal 209 and is transmitted on a line 101. A processing selecting circuit 27 decides the processing mode in accordance with a method, described in detail below, upon referring to the block data on line 103, the value of the quantization step g on line 101 and a previous-frame memory 28. When it has been decided that the method of encoding interframe difference is appropriate, the processing selecting circuit 27 reads data of a block at a position identical with that of the input block out of the previous-frame memory 28 via line 106 and outputs this data on line 114. When it has been decided that the method of motion-compensating encoding of interframe difference is appropriate, the processing selecting circuit 27 reads the best matching block data out of the previous-frame memory 28 via line 106 and outputs this data on the line 114. When it has been decided that intraframe near-vicinity MC is appropriate, the processing selecting circuit 27 similarly reads the best matching block data that has already been decoded out of the previous-frame memory 28 via line 106 and outputs this data on the line 114. When it has been decided that intraframe encoding is appropriate, the processing selecting circuit 27 produces zero data and provides the data on the line 114. At the same time, the processing selecting circuit 27 outputs, on a line 116, vector data representing the relative positions of the best matching block, which has been obtained by motion compensation, and the encoded block. The block data on the line 114 is transmitted on lines 203 and 204.

The difference between the block data from the line 203 and the input block data from the line 202 is determined and fed into a masking unit 22 via a DCT (discrete cosine transform) circuit 21. When the signal from line 205 indicates the overflow state, the processing selecting circuit 27 unconditionally selects interframe-difference encoding and the masking unit 22 masks all of the difference data to zero. The DCT coefficient data from the masking unit 22 is quantized by a quantizer 23 and the quantized data is provided to an encoder 24 and a reverse quantizer 25. In response to a selection-mode signal from line 115, the encoder 24 assigns a Huffman code to the quantized DCT coefficient data and outputs the result on a line 207. By means of reverse quantization, the reverse quantizer 25 reproduces frequency data identical with that provided to an external decoder, not shown. The reproduced frequency data is again transformed into a difference signal by a reverse-DCT circuit 26, and the difference signal is added to the signal from the line 204, thereby reproducing an image identical with that transmitted. This image is again stored in the previous-frame memory 28.

Figure 3:
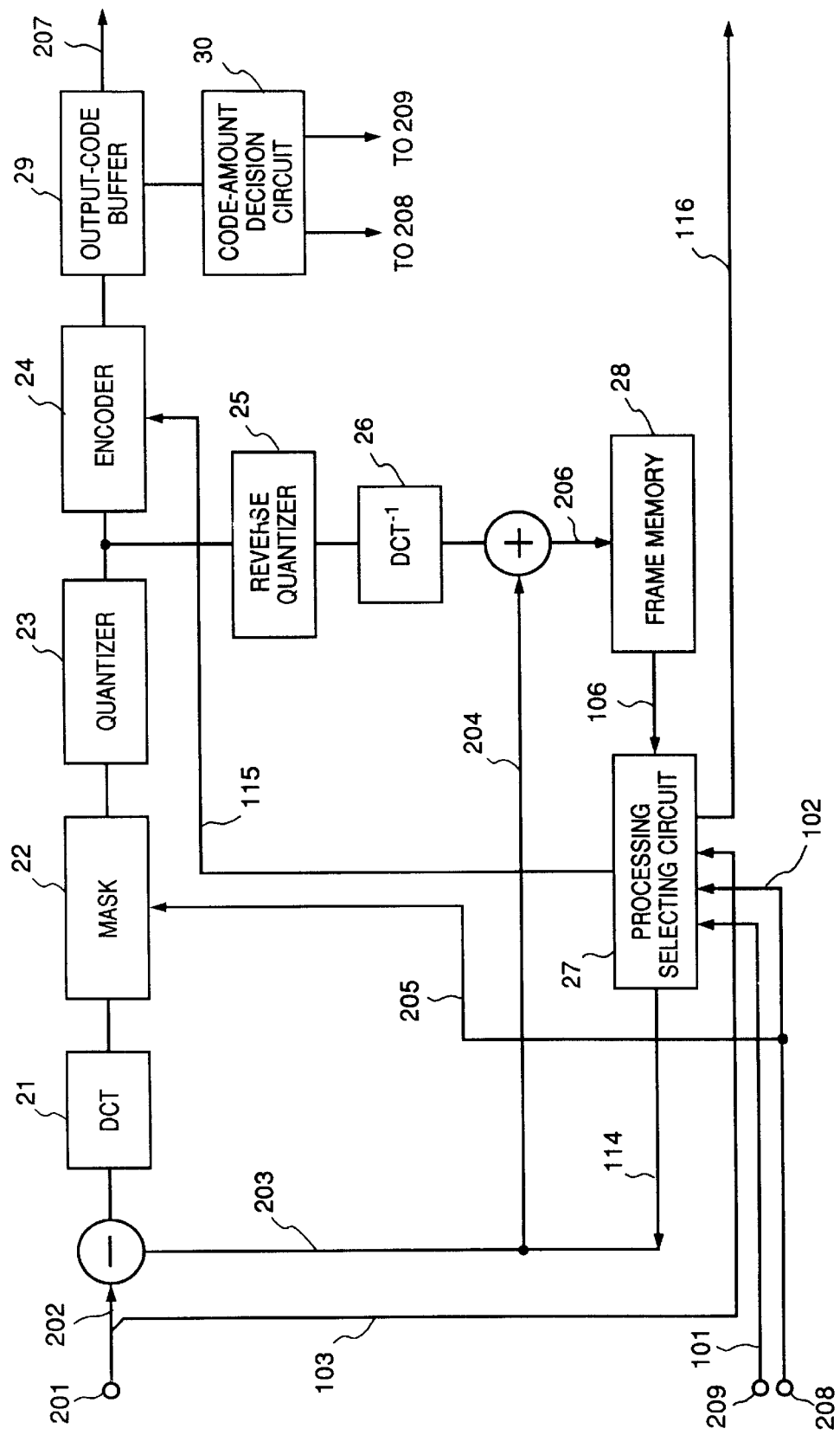
FIG. 3 is a block diagram showing the construction of a moving-picture encoding apparatus according to the embodiment.
Figure 4:
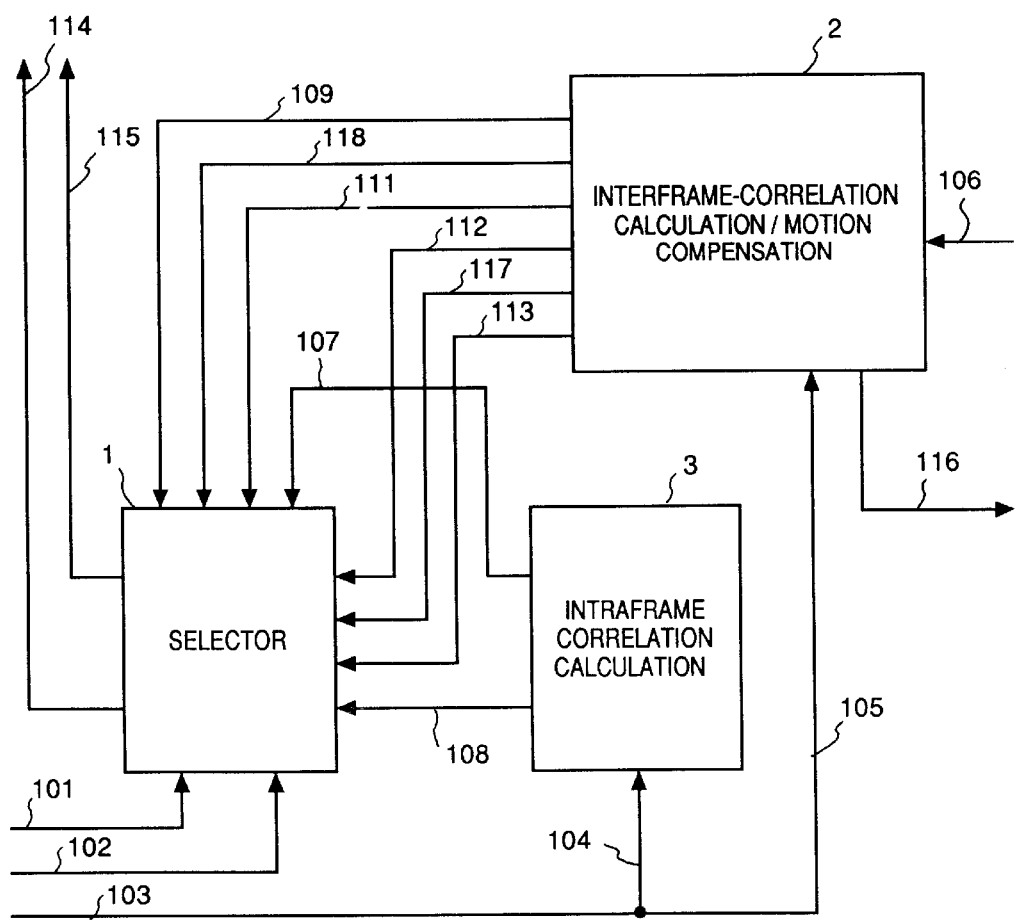
FIG. 4 is a block diagram showing the detailed construction of a processing selecting circuit shown in FIG. 3.

The detailed construction of the processing selecting circuit 27 shown in FIG. 3 is illustrated in the block diagram of FIG. 4.

In FIG. 4, the line 101 is for a signal indicative of the value of the quantization step g, and the line 102 is for entering the overflow state. The block data input on line 103, is split to lines 104 and 105 and is provided to an intraframe-correlation calculating circuit 3 and an interframe-correlation calculating/motion-compensating circuit 2. The latter refers to the previous-frame memory 28 and the present frame which has already been decoded from the line 106, calculates an interframe-difference variance value IVAR, outputs the value of IVAR from a line 109 and outputs block data of the block having the same position as the block of the previous frame from a line 112. The IVAR value is calculated in accordance with the following equation, in which B represents the block of interest (the block to be encoded) and PB denotes the block of the previous frame. N is a variable which indicates block size. For example, if a block consists of 8×8 pixels, N=8. Similarly, if a block consists of 16×16 pixels, N=16:

$$IVAR = \frac{1}{N^2}\Sigma\Sigma(B-PB)^2 \qquad (1)$$

Further, the interframe-correlation calculating/motion-compensating circuit 2 compensates for motion between frames and retrieves the best matching block in the previous frame, outputs this block from line 113, calculates a geometrical average of motion-compensated interframe VarDIf in accordance with Equation (2) below and outputs this mean value on a line 111.

$$VarDif = \frac{1}{N^2}\Sigma\Sigma(B-PB)^2 \qquad (2)$$

Further, the interframe-correlation calculating/motion-compensating circuit 2 performs intraframe near-vicinity MC, retrieves the best matching block from the decoded portion of the present frame, and outputs this block on line 117. In addition, the circuit 2 outputs, from line 118, a variance VarImc indicating the difference with respect to the best matching block. The calculation of VarImc is in line with the method of calculating VarDif.

As for interframe MC motion compensation in the interframe-correlation calculating/motion-compensating circuit 2, Equation (3), shown below, is used to calculate matching values with respect to blocks offset, in units of one pixel, above and below and to the left and right within a range of seven pixels, with a block at the same position as in the previous frame serving as the center. A block that gives the minimum value among these values is adopted as the best matching block.

$$\text{Matching Value} = \Sigma\Sigma(B-MCB)^2 \qquad (3)$$

where MCB represents an adjacent block in the previous frame.

With regard to input block data, the intraframe correlation calculating circuit 3 obtains a variance value VarOr in accordance with Equation (4) below, delivers this value from line 107, generates a dummy block of all-0 data and provides the block on signal line 108.

$$VarOr = \frac{1}{N^2}\Sigma\Sigma(B)^2 - \left\{\frac{1}{N^2}\Sigma\Sigma(B)\right\}^2 \qquad (4)$$

In accordance with the provided signals IVAR 109, VarImc 118, VarDif 111, VarOr 107, the g value 101 and overflow information 102, a selector 1 determines which of the block data on line 112, 113, 108 or 117 to pass through line 114.

Figure 5:
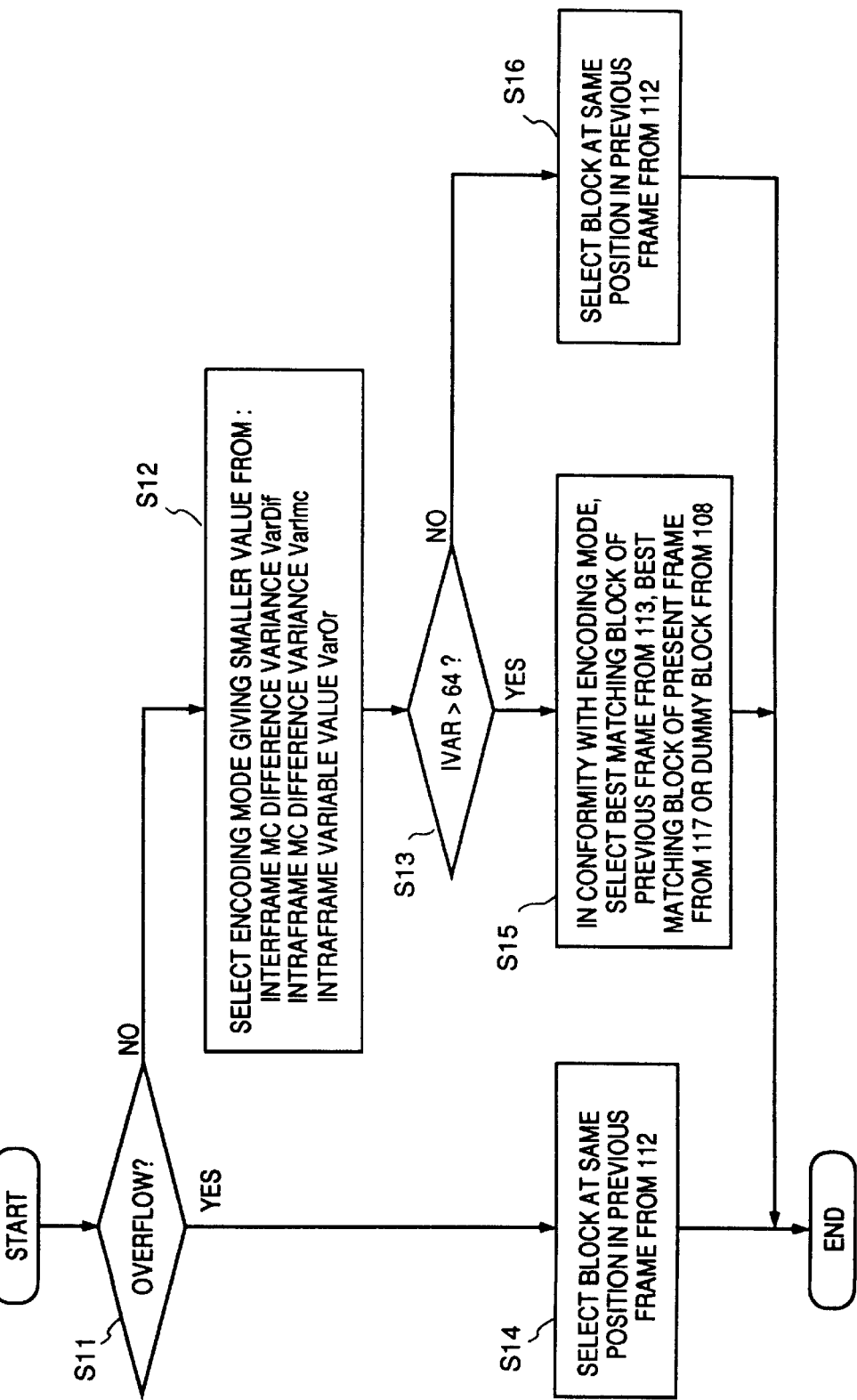
FIG. 5 is a flowchart illustrating a processing selection method according to this embodiment.
Figure 6:
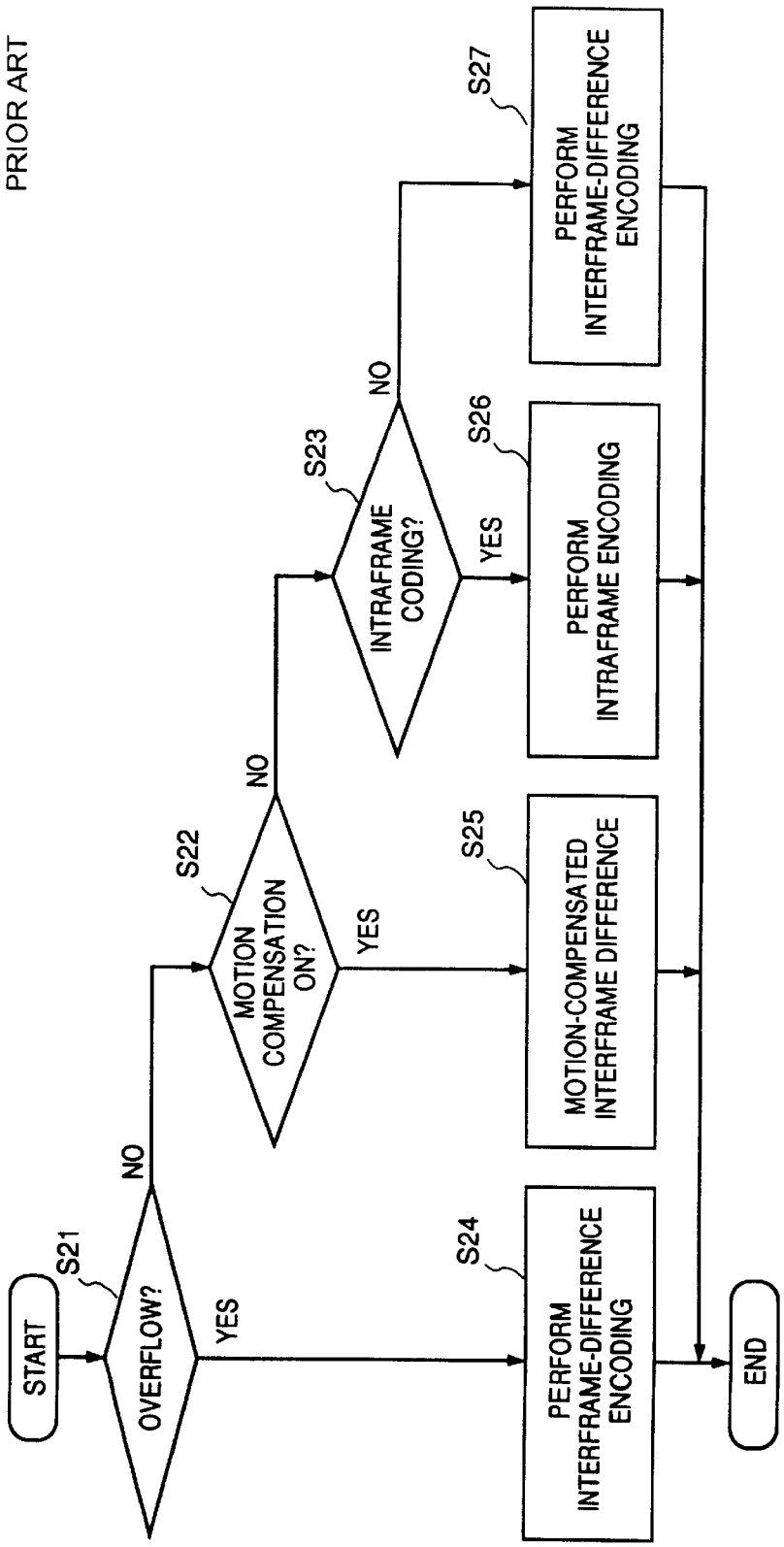
FIG. 6 is a flowchart illustrating a processing selection method according to the prior art.
Figure 7:
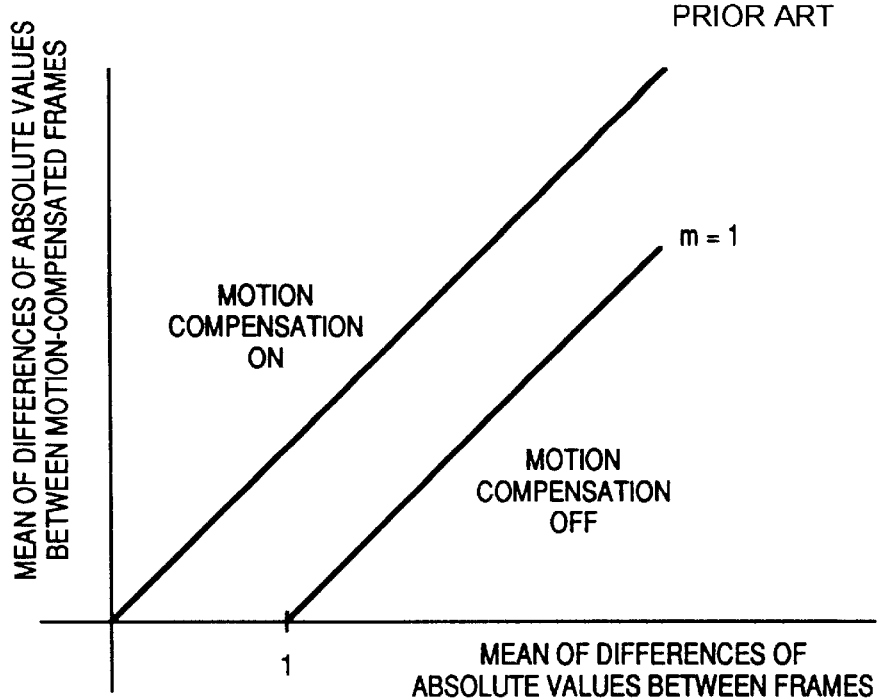
FIG. 7 is a diagram for describing processing selection according to the prior art.
Figure 8:
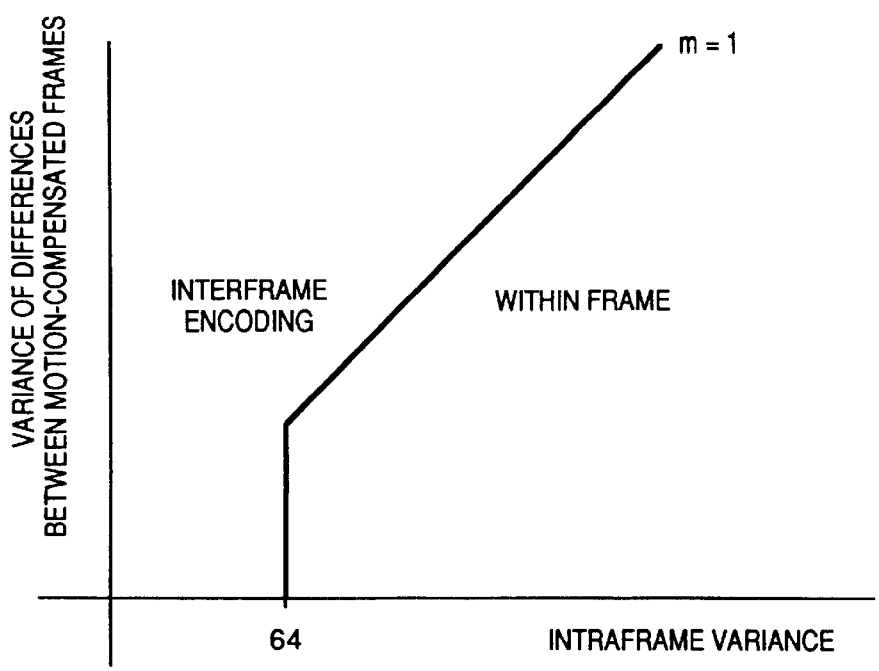
FIG. 8 is a diagram for describing processing selection according to the prior art.
Figure 9:
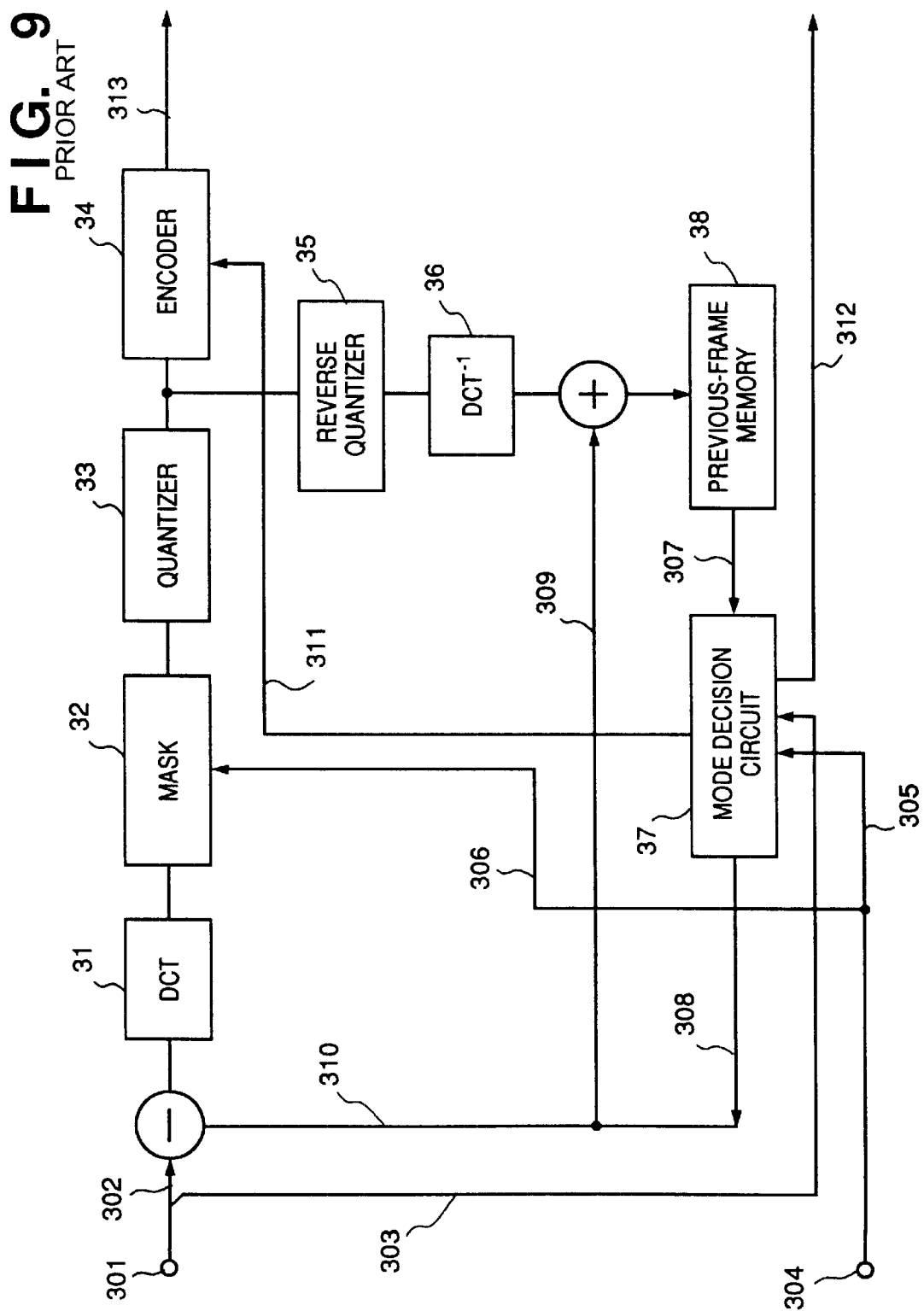
FIG. 9 is a block diagram showing the construction of a moving-picture encoding apparatus according to the prior art.

The decision processing of the selector 1 is described with reference to the flowchart of FIG. 5.

At step S11, it is determined whether the overflow state is in effect on the basis of the overflow signal on line 102. If overflow has occurred, the program proceeds to step S14, at which encoding of interframe difference is selected and block data at the identical position in the previous frame is selected from the signal line 112. If overflow has not occurred, the program proceeds to step S12, where it is decided whether to use a block based upon interframe MC, intraframe near-vicinity MC or intraframe encoding. More specifically, VarOr, VarDif and VarImc on lines 107, 111, 118 are compared and the encoding mode which provides the smallest value is selected. Then, at step S13, the selected smallest value and IVAR from line 109 are compared. If the result of the comparison is that the value of IVAR is equal to or less than 64, the program proceeds to step S16, at which the block at the same position in the previous frame is selected from line 112. If IVAR is greater than 64, then the program proceeds to step S15, at which processing is executed in accordance with the selection made earlier at step S12. Specifically, in case of intraframe near-vicinity MC, the intraframe near-vicinity best matching block is selected from line 117 and outputted on line 114; in case of interframe MC, the interframe best matching block is selected from line 113 and outputted on line 114; in case of intraframe encoding, the dummy block is selected from line 108 and outputted on line 114. Further, the selected mode is outputted from line 115.

In accordance with the illustrated embodiment as described above, when there is a scene change in a moving-picture sequence, correlation between the picture after the scene change and the picture before the scene change is lost. As a result, intraframe encoding is performed even in monotonous background portions in the new picture because locations that resemble each other in the two pictures cannot be found over the entire frame. However, a reference image can be obtained from the new picture, which has already been encoded. In other words, it is possible to use neighborhood correlation within the picture. This makes it possible to construct an image using a smaller amount of code in comparison with the prior art.

Thus, in accordance with the illustrated embodiment, it is possible to carry out more efficient encoding.

The present invention can be applied to a system constituted by a plurality of devices or to an apparatus comprising a single device. Furthermore, it goes without saying that the invention is also applicable to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. An image encoding apparatus, comprising:
    a) an inputter via which image data is input;
    b) an encoder that receives the image data and encodes the image data in block units, said encoder having at least an intrapicture motion compensated encoding mode and an interpicture encoding mode, wherein the intrapicture motion compensated encoding mode performs encoding by using a difference between a block to be encoded and another block in a picture including the block to be encoded;
    c) a memory that stores the image data encoded by said encoder; and
    d) a controller that adaptively controls an encoding mode in accordance with correlation between pictures and correlation within a picture,
    wherein said controller selects the interpicture encoding mode unconditionally and masks difference data to zero when a data monopolization quantity of the memory exceeds a predetermined value.

2. The apparatus according to claim 1, wherein said encoder has an interpicture motion compensated encoding mode.

3. The apparatus according to claim 1 or 2, wherein said encoder has an intrapicture encoding mode.

4. The apparatus according to claim 1 wherein said controller comprises a calculator that calculates correlation between pictures and correlation within a picture.

5. The apparatus according to claim 4, wherein said calculator calculates a difference dispersion value between pictures and a difference dispersion value within a picture.

6. An image encoding method, comprising:
    a) an inputting step of inputting image data;
    b) an encoding step of encoding the image data in block units, having at least an intrapicture motion compensated encoding mode and an interpicture encoding mode, wherein the intrapicture motion compensated encoding mode performs encoding by using a difference between a block to be encoded and another block in a picture including the block to be encoded;
    c) a storing step of storing the image data encoded in said encoding step in a memory; and
    d) a controlling step of adaptively controlling an encoding mode in accordance with correlation between pictures and correlation within a picture,
    wherein said controlling step selects the interpicture encoding mode unconditionally and masks difference data to zero when a data monopolization quantity of the memory exceeds a predetermined value.

7. The apparatus according to claim 1, wherein said encoder performs encoding in block units having a plurality of pixels.

8. The apparatus according to claim 7, wherein said encoder performs encoding by using orthogonal transform processing.

9. The apparatus according to claim 1, further comprising a masking circuit, arranged to receive the image data and to mask the image data in accordance with an amount of data stored in said memory.

* * * * *